United States Patent [19]

Grisham et al.

[11] Patent Number: 5,730,875
[45] Date of Patent: *Mar. 24, 1998

[54] METHOD AND APPARATUS FOR OPTIMIZING AND CONTROLLING GAS-LIQUID PHASE CHEMICAL REACTIONS

[75] Inventors: Thomas L. Grisham, Tyler; Janet K. Peters, Kilgore; Keith W. Sharp, Richmond; Edward E. Ebel, Mabank, all of Tex.

[73] Assignee: Revtech Industries, Inc., Kilgore, Tex.

[*] Notice: The term of this patent shall not extend beyond the expiration date of Pat. No. 5,529,701.

[21] Appl. No.: 749,742

[22] Filed: Nov. 15, 1996

Related U.S. Application Data

[60] Provisional application No. 60/006,959, Nov. 17, 1995.
[51] Int. Cl.⁶ .................................. C02F 1/38; C01D 7/00
[52] U.S. Cl. .......................... 210/638; 210/749; 210/788
[58] Field of Search ............................. 423/423, 659; 210/638, 702, 703, 718, 749, 787, 788, 205, 221.2, 512.1; 96/216

[56] References Cited

U.S. PATENT DOCUMENTS

| | | | |
|---|---|---|---|
| 4,397,741 | 8/1983 | Miller | 210/512.1 |
| 4,744,890 | 5/1988 | Miller | 210/788 |
| 4,838,434 | 6/1989 | Miller | 210/221.2 |
| 5,116,488 | 5/1992 | Torregrossa | 210/512.1 |
| 5,470,465 | 11/1995 | Moorehead | 210/205 |
| 5,500,130 | 3/1996 | Smith | 210/221.2 |
| 5,500,135 | 3/1996 | Smith | 210/221.2 |
| 5,520,818 | 5/1996 | Smith | 210/221.2 |
| 5,529,701 | 6/1996 | Grisham | 210/787 |
| 5,531,904 | 7/1996 | Grisham | 210/703 |

OTHER PUBLICATIONS

Ye Y. "A Novel High-Capacity Technology for Removing Volatile Organic Contaminants From Water", Proceedings of Waste Stream Mimimization and Utilization Innovative Concepts, pp. 2.1–2.5, Apr. 1997.

*Primary Examiner*—Ernest G. Therkorn
*Attorney, Agent, or Firm*—Ronald B. Sefrna

[57] ABSTRACT

A method of optimizing and controlling gas-liquid phase chemical reactions includes the steps of introducing a liquid reactant to the hollow interior of a cylindrical porous tube in a thin film following a spiral flow pattern around and along the wall of the tube; controlling the physical characteristics of the liquid film and the flow pattern followed by the film through the tube; mixing a gas reactant and an inert gas in preselected proportion; sparging the mixture of gas reactant and inert gas through the wall of the tube and into the liquid film to form a multiplicity of gas bubbles in interfacial contact with the gas; allowing the gas reactant and the liquid reactant to chemically react; segregating the remaining gas from the liquid within the tube; and separating the cleaned liquid stream from the contaminant laden gas stream.

1 Claim, 2 Drawing Sheets

METHOD AND APPARATUS FOR OPTIMIZING AND CONTROLLING GAS-LIQUID PHASE CHEMICAL REACTIONS

This application claims the benefit of U.S. Provisional application Ser. No. 60/006,959, filed Nov. 17, 1995.

TECHNICAL FIELD

The present invention generally relates to methods of and apparatus for contacting gas and liquid phases for interfacial interaction, and more specifically relates to methods and apparatus for optimizing those conditions for supporting and carrying out chemical reactions between gaseous and liquid reactants, controlling those reactions, and controlling the thermodynamic factors associated with those reactions.

RELATED APPLICATIONS

The subject matter of this application is related to the subject matter of U.S. patent application Ser. No. 08/406,502, now issued as U.S. Pat. No. 5,531,904, titled "Gas Sparging Method For Removing Volatile Contaminants From Liquids"; to the subject matter of U.S. patent application Ser. No. 08/492,766, now issued as U.S. Pat. No. 5,529,701, titled "Method And Apparatus For Optimizing Gas-Liquid Interfacial Contact"; and to the subject matter of pending U.S. patent application Ser. No. 08/617,416, titled "Method And Apparatus For Creating Gas-Liquid Interfacial Contact Conditions For Highly Efficient Mass Transfer.

BACKGROUND OF THE INVENTION

Many chemical and evaporation process operations involve molecular mass transfer between a gas stream and a liquid stream across a gas-liquid interface. In multiple component systems, when material is transferred from one bulk phase to another bulk phase across the interface which separates the two phases, the resistance to mass transfer in each phase causes a concentration gradient to occur in each phase. As the transferring component moves across the phase interface, the component concentration in the phase from which the component transfers decreases at the interface, creating a concentration gradient as compared to the bulk concentration of that phase. The phase into which the component transfers then has a higher concentration of the transferring component near the interface compared to the bulk concentration of that phase. The concentration at the interface of the transferring component in the liquid or gaseous phase is generally unequal even if expressed in the same concentration units. The relative concentration in each phase is described by the laws of thermodynamic equilibrium. In systems involving chemical reaction between gaseous and liquid reactants, the progress of the reaction is directly dependent upon the rate of component transfer across the gas-liquid interface.

In phase equilibria it is generally recognized that the concentration in the gaseous phase is related to the concentration in the liquid phase by a partition coefficient or equilibrium factor. Gas or vapor versus liquid or solvent phase equilibrium data have been studied and recorded for many chemical compounds in various solvents as a function of concentration, temperature, and pressure. Also, phase equilibrium behavior for complex mixtures of compounds in various solvents and solvent mixtures at various temperatures and pressures has been reported.

It is generally assumed that mass transfer between a volume of liquid and a volume of gas across an interfacial contact area is instantaneous, but the actual rate of transfer is subject to various limiting factors, including the rate of diffusion of component molecules through the liquid to or from the interface, and the rate of diffusion of component molecules through the gas from or to the interface. In any case, transfer between liquid and gas is always favored by maximizing the interfacial area relative to liquid and gas volumes, and in multiple component systems, by minimizing the distance of diffusion through the liquid to the interface.

The dynamics of mass transfer across a gas-liquid interface may be quantified. The rate of transfer of a compound at the gas-liquid interface has been derived by Bird, Stewart, and Lightfoot, and expressed as $$N_A = (D_{AB} C_{AO}/\delta)(1-\Gamma)$$

where $N_A$ = molar flux (moles/$L^2$t) (L=length; t=time)

$D_{AB}$ = binary diffusivity for system A-B ($L^2$/t)

$C_{AO}$ = the interfacial concentration of A in the liquid phase, which is assumed to be at equilibrium with the gas phase at the interface (moles/$L^3$)

$\delta$ = film thickness (L)

$\Gamma = C_A/C_{AO}$ $C_A$ = concentration in the main body of the liquid.

The foregoing equation is taken from the book *Transport Phenomena*, R. Byron Bird, Warren E. Stewart, and Edwin N. Lightfoot, John Wiley & Sons, Inc., 1960 (at page 535).

Traditional methods of creating gas-liquid interfacial contact conditions include the use of simple aerated tanks, spray towers, bubble tray columns, and packed columns to create a gas-liquid interface. Traditional technology uses counter current, multiple equilibrium stages in order to take full advantage of the equilibrium conditions for the component or components to be transferred and chemically reacted.

While traditional methods and associated apparatus do achieve interfacial contact and mass transfer, they are inefficient, requiring long processing times, large equipment volumes, and high overall gas to liquid volumetric flow ratios. The inefficiency associated with the traditional prior art approaches arises largely from the relatively low gas-liquid interfacial area to volumes provided by the equipment, and the relatively long liquid diffusion distances to an interface. As a result of the inefficient gas to liquid contact, the internal apparatus volume required for each transfer unit (i.e., the volume required for mass transfer equilibrium to be reached between given volumes of gas and liquid under established operating conditions) is large. With regard to traditional apparatus, comparisons are typically expressed in terms of the height of a transfer unit.

With traditional apparatus, such as tray towers and packed towers, the designer's ability to increase the rate of mass transfer within the apparatus (and thus decrease the apparatus volume for each transfer unit) by increasing the volumetric flow ratio of gas to liquid is limited by the need to avoid foaming and liquid entrainment in the gas stream.

There remains a substantial and unfilled need for a method of optimizing gas-liquid interfacial contact conditions for efficient interphase contact and mass transfer of chemical reactants, and a need for apparatus in which highly efficient conditions can be economically created, controlled, and maintained.

SUMMARY OF THE INVENTION

The present invention provides a method for optimizing conditions for the progress of chemical reactions between gaseous reactants and liquid reactants, controlling the reactions, and creating and controlling the thermodynamics of the reaction system. The present invention is related to a broader scope method, and apparatus for the performance thereof, disclosed in detail in the related applications identified above.

The relevant apparatus in which chemical reactions to which the method of the present invention relates will be carried out generally includes a horizontally disposed cylindrical tube, open at both ends, with a porous wall and a hollow interior, a liquid feed assembly disposed at one end of the tube, a gas-liquid separator assembly disposed at the opposite end of the tube, an outlet liquid collection assembly, and a gas discharge assembly at each end of the tube. The tube is surrounded by an outer jacket that encloses the porous wall and forms a gas plenum. The plenum preferably is divided into multiple segments or sections for controlling the distribution of the gas along the length of the tube.

Liquid is fed tangentially into the interior of the tube through the liquid feed assembly with sufficient pressure and flow rate to create a high velocity flow of the liquid in a thin film around and along the inner surface of the porous wall of the tube. When the liquid meets the interior of the tube the inlet velocity vector is divided into a radial velocity vector and a longitudinal velocity vector, which may be controlled by controlling the angle at which the liquid meets the interior of the tube. The high velocity flow of the liquid in a swirl pattern around the tube produces a centrifugal force of significant magnitude, acting to force the liquid against the inner surface of the tube with a velocity vector generally perpendicular to the longitudinal axis of the tube. The liquid velocity, and thus the outward acceleration, is sufficient to maintain the thickness of the liquid film through the length of the tube with insignificant variation.

Pressurized gas is introduced into the plenum between the jacket and the outer surface of the porous wall of the tube and forced through the porous wall. The gas exits the porous wall at its inner surface and is immediately contacted by the liquid, which is moving at high velocity relative to the wall and to the gas as it enters the interior of the tube. The gas is sheared from the porous wall by the rapidly moving liquid into a multitude of very fine bubbles, which are carried by the moving liquid in its swirl flow pattern radially around the inner surface of the porous wall, and longitudinally toward the liquid exit from the tube. In general, the diameter of each of the bubbles should be in the range of about 1 to 40 microns, with 1 to 10 microns particularly preferred. The mixture of liquid and gas bubbles forms a two phase system that exists in an annular pattern around and along the inner surface of the tube. The buoyancy of the bubbles relative to the liquid causes them to move toward the center of the tube against the centrifugal (outward) acceleration, through the froth created by the two phase flow as it moves around the inner surface of the tube. The gas exits from the two phase flow at the inner boundary created by the force field and is transported from the tube through the nearest end. Because the specific gravity of the liquid is much higher than the specific gravity of the gas, the centrifugal acceleration imposes a substantially higher force on the liquid than on the gas. The gas is thus able to move to and exist within a zone or column at the center of the tube while the liquid is forced toward the wall of the tube, controlling the froth created by the two phase flow, eliminating liquid entrainment with the gas in the central portion of the tube, and inducing a clean separation between the gas column and the two phase froth.

The behavior of the gas bubbles, in terms of the characteristics of their movement through the froth phase and the division between gas and liquid at the boundary between the froth and the free gas column, is a significant factor. As the gas bubbles are sheared from the porous wall of the tube by the flowing liquid, those bubbles are immediately entrained in the flow of liquid and follow the same general spiral flow pattern around and along the wall of the tube. Simultaneously, and immediately upon separation from the wall, the bubbles also begin traveling through the liquid toward the center of the tube, in a direction orthogonal to the motion of the liquid stream, or radial to the tube. The radial flow of the bubbles is a result of their buoyancy relative to the liquid under the operating conditions of the system.

As the liquid spirals around the inner surface of the tube within the range of effective operating parameters, a centrifugal force field of significant magnitude is created, and corresponding centrifugal acceleration is imposed on the liquid film and on the gas bubbles formed within the liquid. The centrifugal acceleration generally ranges from about 400 G to about 1500 G (where G is the standard gravitational acceleration). At those centrifugal accelerations the radial movement of the gas bubbles through the liquid film is not materially affected by the earth's gravity, since the gravitational acceleration is insignificant in comparison to the centrifugal acceleration, and the bubble behavior may be considered to be uniform at all positions around the tube. Due to the velocity profile of the flowing froth, the velocity of the froth increases as the distance from the fixed wall of the porous tube increases. As the distance from the wall increases, the radial distance from the center of the tube to a point in the froth decreases. The acceleration field correspondingly varies with distance from the tube wall in accordance with the following acceleration equation:

$$a = V^2/R$$

where
a=acceleration
V=radial velocity, and
R=distance from the center of the tube The combination of increase in velocity and decrease in radius causes the magnitude of the centrifugal force field to increase up to 600% at the inner surface of the froth layer, where the gas exits to the center of the tube following its passage through the liquid. In general, the specific gravity of the gas is less than about 0.1% of the specific gravity of the liquid, so the force imposed on the liquid greatly exceeds the force imposed on the exiting gas. The liquid is therefore strongly forced toward the wall of the porous tube while liquid-free gas is minimally affected. When a bubble emerges from the froth layer at the boundary, the forces acting on the bubble exceed the surface tension of the liquid film surrounding the gas and defining the bubble, the bubble ruptures, the freed gas enters the gas core at the core of the tube, and the liquid returns to the froth phase.

Once any given volume of gas has passed through the liquid, that gas is quickly removed from the core of the tube at both ends, driven by the flow of gas newly exiting the froth. The overall gas flow from the apparatus is thus bi-directional, or bi-current with the flow of liquid, and any given volume of gas will generally exit the tube through the end closer to the point at which that volume of gas exits from the froth.

Under the conditions produced by the method and the apparatus, mass transfer between gas and liquid phases, a necessary step for the reaction of gaseous and liquid reactants, to the point of equilibrium is effectively instantaneous between each bubble and the immediately surrounding liquid. In effect, the two phase froth created by the method and apparatus of the invention may be viewed as a system in which only gas to liquid interface conditions exist, with neither bulk liquid nor bulk gas volumes. Because the mass transfer is effectively instantaneous and transfer rate ceases to be a factor in limiting subsequent chemical reactions, those reactions may proceed at an optimal rate without physical constraint.

These conditions cannot be created in prior art apparatus, or by prior art methods, because of their inability to create physical systems in which optimal reaction conditions can exist. Such systems require large numbers of extremely small bubbles existing in very close proximity within a controlled froth, with continuous introduction of new bubbles to the froth and removal of an equivalent volume of gas from the froth without entrainment of the liquid through which the gas bubbles move at high velocity. These physical requirements can be achieved only by apparatus in which the liquid is in rapid movement orthogonal to the flow vector of incoming gas, and in which the gas-liquid mix (froth) exists in a radial force field.

The apparatus and method of the invention also provide the ability to control thermodynamic factors associated with mass transfer and chemical reaction, yielding unprecedented advantages over the prior art. The thermodynamic behavior of the system in relation to mass transfer is discussed in the related applications identified above. With mass transfer across a gas-liquid interface in general, transfer from the liquid phase to the gas, or vapor, phase involves an associated heat of vaporization, and transfer from the gas, or vapor, phase to the liquid phase involves an associated heat of solution. It has been recognized that there is a direct connection between latent heat of vaporization and surface energy, and it has been further determined that the thermodynamics of mass transfer may be controlled by controlling the behavior of the bubbles as they pass through the froth existing in the tube of the apparatus. Surface energy of the bubbles in the froth is a function of bubble radius, and since bubble radius may be controlled within the unique conditions created in the apparatus of the invention, the relationship between surface tension, surface area, and latent heat of vaporization provides a mechanism through which system thermodynamic effects may be controlled.

In the context of a reaction system in which a gas is transferred to, or dissolved in, the liquid phase, the reactant gas may be sparged through the porous tube of the apparatus to form the minute bubbles existing in the two-phase froth, and gas is transferred across the interface to the liquid. If the gas introduced through the tube wall to the froth phase contains only the reactant gas, and if transfer from the liquid phase to the gas is minimal, the bubbles will tend to shrink as they move through the froth because of the one way transfer, and the temperature of the liquid will tend to increase due to the heat of solution of the gas in the liquid. The temperature of the liquid will also tend to increase when the chemical reactions occurring in the liquid phase are exothermic. Similarly, the transfer of liquid to a gas phase (e.g., evaporation) tends to decrease liquid temperature due to the latent heat of vaporization of the liquid.

These characteristics are utilized within the method of the invention to provide a means for temperature control. The reactant gas may be mixed, in a selected proportion, with an inert, or non-reactive, carrier gas to which the liquid phase of the system (either a reactant liquid or a solvent liquid with which the reactant is in solution) will readily transfer across the interface. When the gas mixture is introduced to the froth there is simultaneous transfer of reactant gas to the liquid phase and of liquid (vapor) to the gas phase, creating an "offset" between the associated heats of solution and vaporization. Since heats of solution and heats of vaporization are well known for most reactants and/or solvents, the compositions of the gas and liquid phases can be manipulated in order to achieve a desired balance and thus control temperature changes occurring in any given system.

DESCRIPTION OF PREFERRED EMBODIMENT

Figure 1:
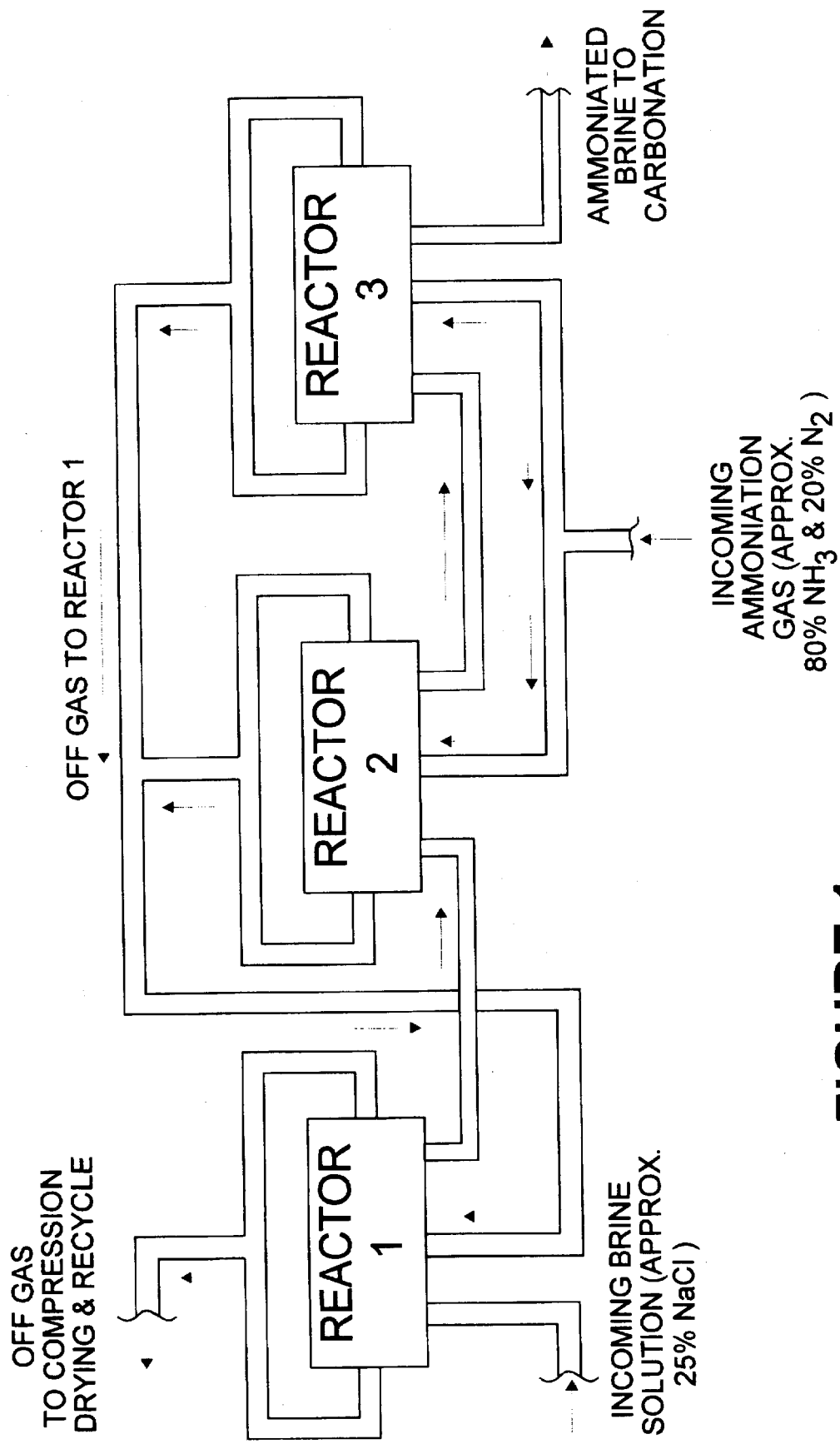
FIG. 1 is a schematic illustration of a multiple reactor apparatus configuration for the introduction of ammonia to a sodium chloride solution as a step in a use of the method of the invention for the production of sodium bicarbonate.

The method of the invention, performed using apparatus as described above, may be used to great advantage for the production of sodium bicarbonate in the ammonia soda process. Schematic illustrations of preferred apparatus configurations for using the method and apparatus of the invention to carry out the reactions involved in that process are provided in the accompanying drawing figures.

The production of sodium bicarbonate by the ammonia soda process was one of the most basic industries of the world dating from the 1800's. The process involves reacting or dissolving gaseous ammonia into a saturated solution of sodium chloride to form an equal molar ratio of sodium and ammonium ions. The solution is then reacted with gaseous carbon dioxide to form a precipitate of sodium bicarbonate and a solution of ammonium chloride. The precipitated sodium bicarbonate is filtered from the solution and subsequently dried to produce commercial grade sodium bicarbonate or further thermally decomposed to produce sodium carbonate, water, and carbon dioxide.

The production via this process has not been commercially viable for the past several years because of its poor economics relative to the mining of naturally occurring trona ore. The domestic U.S. production of sodium carbonate via the mining of trona ore in 1994 was 1,275,000 tons. Most of this production occurs in western Wyoming and is shipped to principal markets in the eastern United States and to sea ports for world export.

Although the raw materials for the ammonia soda process (sodium chloride and calcium carbonate—the ammonia for the process is subsequently recovered and recycled so little cost is involved) are found throughout the world, the cost of production via this process has been economically prohibitive.

The principal economic problem with use of the ammonia soda process is the capital cost and subsequent maintenance cost associated with the size and inefficiency of the conventional process equipment. The size, and associated costs, of the previously operated capital equipment was due to the difficulty of achieving the stoichiometric balance required for the process and controlling the heats of reaction. Additional factors include the corrosion of the large reaction vessels.

The introduction of the gas phase reaction gases along with an inert carrier gas through a microporous tube into a liquid phase swirling in a thin film layer on the inside circumference of the tube in accordance with the method of the invention eliminates those previous difficulties and offers substantial economic advantage. The introduction of the gas phase through micro bubbles allows near instantaneous chemical equilibrium in accordance with the chemical potential of the reactive phases. Additionally, when a mixture of reactant gas and inert gas is used the bubbles do not completely dissolve and thus provide a continuing interface, which allows water to transfer from the liquid phase to the gaseous phase. The phase change of water and the associated latent heat of vaporization allows the overall process to occur under near isothermal conditions. The ratio of reactant gas to inert carrier gas can be controlled to assure operation of the process at constant temperature, or at temperatures which do not significantly affect the desired equilibrium vapor pressure.

A process conforming to the following parameters may be very effectively used to produce sodium bicarbonate through the ammonia soda process without the disadvantages and problems of the prior art. A near saturated solution of sodium chloride is swirled through the tube and a mixture of ammonia gas and nitrogen with a volumetric ratio of 4 parts ammonia to 1 part nitrogen is reacted with the solution in sequential tubes as illustrated in FIG. 1. The off gas from the sequential tubes is mixed and fed through a preammoniator tube.

The volume of $NH_3$ required to achieve equal molar ratio of Na to $NH_4$ is approximately 100 standard cubic feet of $NH_3$ per cubic foot of solution. The 80:20 gas ratio in sequential reaction achieves the required ratio and produces an off gas of approximately 25% $NH_3$ and 75% $N_2$. The combined gas streams are fed to the preammoniator which will remove substantially all of the ammonia from the gas phase. The off gas from the preanunoniator is recompressed, dried, and then mixed with additional ammonia for reintroduction into the sequential reactors.

Figure 2:
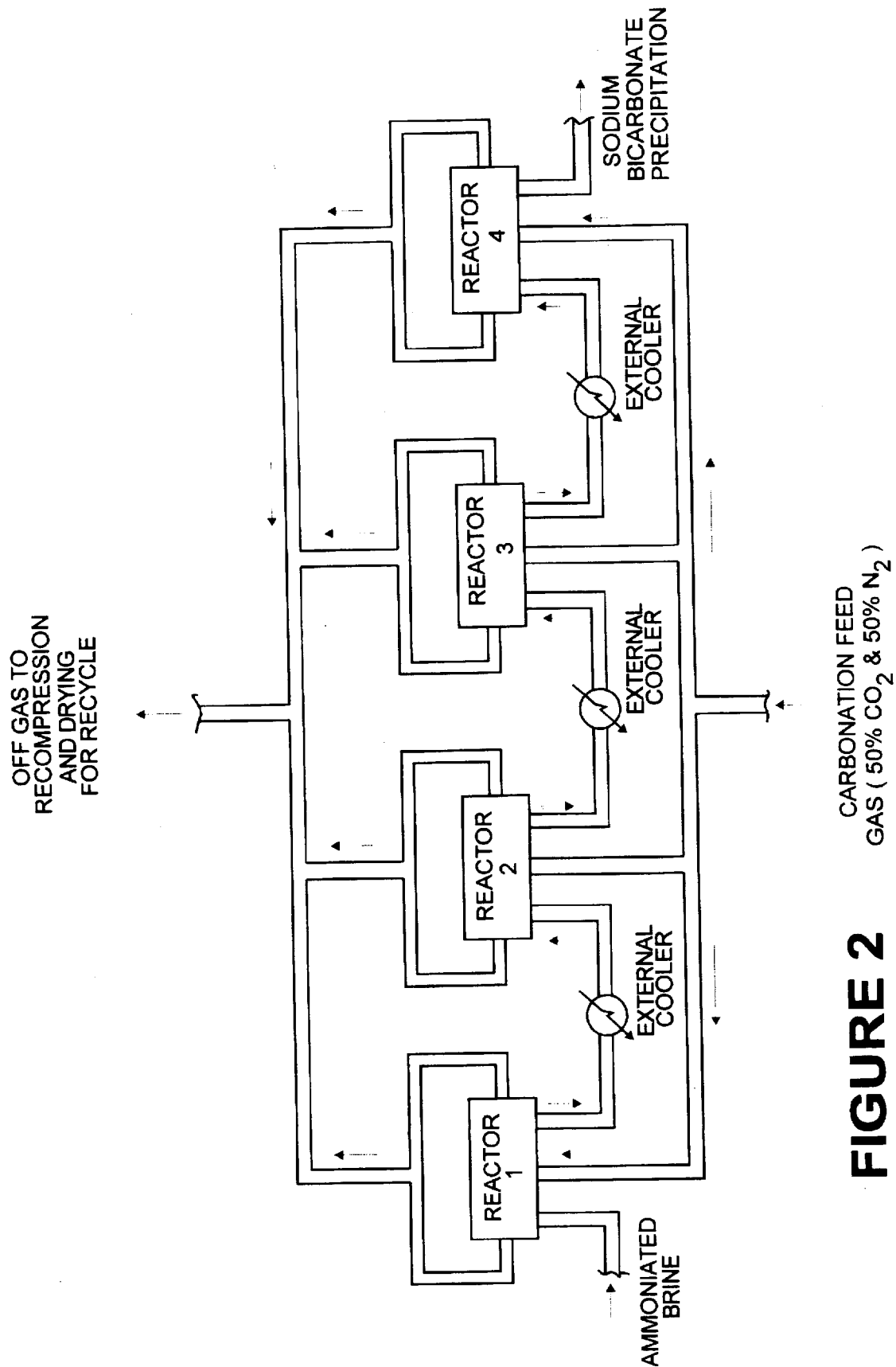
FIG. 2 is a schematic illustration of a multiple reactor apparatus configuration for the introduction of carbon dioxide to an ammoniated sodium chloride solution as a step in a use of the method of the invention for the production of sodium bicarbonate.

The carbonation portion of the process, schematically illustrated in FIG. 2, involves four sequential reactors operating with a one to one volumetric ratio of $CO_2$ to dry $N_2$. The total volume of $CO_2$ is approximately 100 standard cubic feet per cubic foot of liquid processed. If required, the partially reacted solution may be cooled between sequential carbonation steps. Controlling the step reactions from the ammoniated brine to diammonium carbonate to ammonium carbonate and the subsequent interchange from ammonium bicarbonate and sodium chloride to the precipitated sodium bicarbonate and ammonium chloride solution, allows the reactions to proceed at low temperature, which produces greater yields of the desired sodium bicarbonate.

The fact that the sodium bicarbonate reaches the solubility limit and begins precipitation during the final carbonation phase is not a disadvantage for the described process. The precipitate forms in the froth and is subsequently carried with the liquid phase from the unit where it may be separated. The precipitate does not foul the apparatus and thus not hinder the introduction of the gas to the reaction tube through its porous wall.

Although a specific illustrative example has been used to describe the method of the invention, it should be understood that the scope of the method is almost unlimited, and the method may be advantageously employed with essentially any system involving bidirectional mass transfer across a gas-liquid interface, certainly including but not limited to systems involving chemical reaction between gaseous and liquid constituents.

We claim:

1. A method for bringing a reactant gas and a reactant liquid into interfacial contact under conditions conducive to controlled chemical reaction between the reactant gas and the reactant liquid, utilizing apparatus having an elongate tube with first and second ends, with a wall, and with a porous section for the sparging of gas therethrough to the interior of the tube, comprising the steps of introducing a stream of liquid including said reactant liquid to the first end of the porous section of the cylindrical tube tangential to the interior surface of said tube;

controlling the flow of said liquid in a spiral pattern around and along said inner surface of said tube from said first end to the second end so as to impose sufficient centrifugal acceleration upon said liquid to confine said liquid to an annular film of liquid spiraling around said wall of said tube and to prevent said liquid from entering a liquid-free zone extending longitudinally through the central portion of said tube surrounded by said liquid;

mixing said reactant gas with an inert gas in a predetermined proportion to form a reactant gas mixture; and sparging said reactant gas mixture through the wall of said porous section of said tube and into said liquid spiraling through said tube, thereby forming a two phase gas-liquid froth including a multiplicity of bubbles of said reactant gas mixture in interfacial contact with said liquid, said froth confined to an annulus around said liquid-free zone and flowing in a spiral pattern around and along said inner surface of said porous section of said tube around said liquid-free zone.

\* \* \* \* \*